US009868343B2

United States Patent
Uranaka et al.

(10) Patent No.: US 9,868,343 B2
(45) Date of Patent: Jan. 16, 2018

(54) DUMP TRUCK

(71) Applicant: Komatsu Ltd., Minato-ku, Tokyo (JP)

(72) Inventors: Kyouji Uranaka, Yokohama (JP);
Takeo Ootsuka, Hitachinaka (JP);
Taiga Sasaki, Hitachinaka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 15/122,058

(22) PCT Filed: Feb. 27, 2014

(86) PCT No.: PCT/JP2014/054974
§ 371 (c)(1),
(2) Date: Aug. 26, 2016

(87) PCT Pub. No.: WO2015/129006
PCT Pub. Date: Sep. 3, 2015

(65) Prior Publication Data
US 2017/0015185 A1  Jan. 19, 2017

(51) Int. Cl.
*B60K 1/02* (2006.01)
*B62D 21/11* (2006.01)
(Continued)

(52) U.S. Cl.
CPC .................. *B60K 1/02* (2013.01); *B60G 3/20* (2013.01); *B60K 5/10* (2013.01); *B60K 7/0007* (2013.01);
(Continued)

(58) Field of Classification Search
CPC .... B62D 33/02; B62D 21/186; B62D 33/037; B62D 55/06; B62D 12/00; B62D 33/0273; B62D 33/0625
(Continued)

(56) References Cited

U.S. PATENT DOCUMENTS 3,599,819 A * 8/1971 Leijon ..................... E02F 3/422
                                                          298/17.6
3,704,040 A * 11/1972 Davis ...................... B60B 11/00
                                                          280/6.154
(Continued)

FOREIGN PATENT DOCUMENTS

EP          0544597        6/1993
JP        S60-192984 U    12/1985
(Continued)

OTHER PUBLICATIONS

International Preliminary Report on Patentability in corresponding International Application No. PCT/JP2014/054974, dated Aug. 30, 2016, 4 pages.
(Continued)

*Primary Examiner* — D Glenn Dayoan
*Assistant Examiner* — Sunsurraye Westbrook
(74) *Attorney, Agent, or Firm* — Fish & Richardson P.C.

(57) ABSTRACT

A dump truck includes: a vehicle body frame; a body supported by the vehicle body frame and configured to be raised or lowered; a plurality of tires provided to the vehicle body frame via a suspension; and a driving unit in a form of an electric motor configured to drive the tires, in which the vehicle body frame includes: supports respectively supporting an upper arm and a lower arm of a suspension arm of the suspension; and a hollow part at least partially in the vicinity of the supports, and the electric motor is fixed to the vehicle body frame while being housed in the hollow part of the vehicle body frame and supported by an inner surface of the hollow part.

6 Claims, 12 Drawing Sheets

(51) Int. Cl.

| | | |
|---|---|---|
| *B60K 5/10* | (2006.01) | |
| *B60K 7/00* | (2006.01) | |
| *B60K 17/356* | (2006.01) | |
| *B62D 21/02* | (2006.01) | |
| *B62D 21/18* | (2006.01) | |
| *B60G 3/20* | (2006.01) | |
| *B60P 1/04* | (2006.01) | |
| *B60K 11/06* | (2006.01) | |
| *B60K 11/04* | (2006.01) | |
| *B60K 17/04* | (2006.01) | |
| *B60K 1/00* | (2006.01) | |
| *B60P 1/28* | (2006.01) | |

(52) U.S. Cl.
CPC ............. *B60K 17/356* (2013.01); *B60P 1/04* (2013.01); *B62D 21/02* (2013.01); *B62D 21/11* (2013.01); *B62D 21/186* (2013.01); *B60G 2200/144* (2013.01); *B60G 2300/026* (2013.01); *B60K 11/04* (2013.01); *B60K 11/06* (2013.01); *B60K 17/046* (2013.01); *B60K 2001/006* (2013.01); *B60K 2007/0046* (2013.01); *B60P 1/283* (2013.01); *B60Y 2200/142* (2013.01); *B60Y 2304/03* (2013.01)

(58) Field of Classification Search
USPC ........ 298/17 R, 22 R, 17.5, 2, 11, 24, 23 M, 298/23 R; 410/121, 143, 77, 80; 414/809, 498, 24.5, 420, 495, 563
See application file for complete search history.

(56) References Cited

U.S. PATENT DOCUMENTS

| | | | | |
|---|---|---|---|---|
| 5,385,391 | A | | 1/1995 | Dickerson |
| 5,472,062 | A | | 12/1995 | Nagai et al. |
| 6,086,076 | A | * | 7/2000 | Prem ........................ B60G 3/14 180/24.07 |
| 6,408,973 | B1 | * | 6/2002 | Beesley ............... B60K 17/306 180/245 |
| 6,578,925 | B1 | * | 6/2003 | Baker ..................... B60L 11/02 180/167 |
| 8,104,842 | B2 | * | 1/2012 | Fushiki ................ B62D 21/186 298/17 R |
| 2012/0230843 | A1 | * | 9/2012 | Ravipati ............ G05D 23/1932 417/46 |

FOREIGN PATENT DOCUMENTS

| | | |
|---|---|---|
| JP | S61-187734 U | 11/1986 |
| JP | H04-503786 | 7/1992 |
| JP | H05-147445 | 6/1993 |
| JP | H05-193373 | 8/1993 |
| JP | H08-034256 | 2/1996 |
| JP | H09-300984 | 11/1997 |
| JP | 2007-016906 | 1/2007 |
| JP | 2013-216224 | 10/2013 |

OTHER PUBLICATIONS

International Search Report in corresponding International Application No. PCT/JP2014/054974, dated May 27, 2014, 4 pages, with English translation.

* cited by examiner

DUMP TRUCK

CROSS-REFERENCE TO RELATED APPLICATIONS

This application claims priority to International Application No. PCT/JP2014/054974 filed on Feb. 27, 2014, the contents of which are incorporated herein in their entirety.

TECHNICAL FIELD

The present invention relates to a dump truck, for instance, a large-sized driverless off-road dump truck.

BACKGROUND ART

Typically, in an electrically drivable off-road dump truck, an electric motor is housed in an axle housing suspended from a vehicle body frame (see, for instance, Patent Literatures 1 and 2).

In a hydraulically drivable off-road dump truck, such a structure has been known in which a receiving seat is provided to a pivotally movable yoke forming a suspension and a hydraulic motor for driving tires is integrated with the receiving seat (see, for instance, Patent Literatures 3 and 4).

In an all-wheel drive dump truck, it has been known that electric motors corresponding to tires are provided to a pivotally movable frame functioning as the suspension (see, for instance, Patent Literature 5).

CITATION LIST

Patent Literatures

Patent Literature 1: US Patent Application Publication No. 2012/0230843
Patent Literature 2: JP-A-2007-16906
Patent Literature 3: JP-A-05-193373
Patent Literature 4: JP-A-09-300984
Patent Literature 5: U.S. Pat. No. 6,578,925

SUMMARY OF THE INVENTION

Problems to be Solved by the Invention

In Patent Literatures 1 and 2, since the axle housing is required for housing the electric motor, a vehicle body weight is increased.

In Patent Literatures 3 and 4, since the hydraulic motor is provided to the vertically pivotally movable yoke, a rigidity of a part supporting the yoke in the vehicle body frame needs to be reliably secured and a structure of the vehicle body frame becomes complicated.

In Patent Literature 5 in which the electric motor is provided to the pivotally movable frame, no consideration is made with respect to improvement in the rigidity.

An object of the invention is to provide a dump truck having a reduced vehicle body weight and including a vehicle body frame in a simple structure.

Means for Solving the Problems

According to an aspect of the invention, a dump truck includes: a vehicle body frame; a body supported by the vehicle body frame and configured to be raised and lowered; a plurality of tires provided to the vehicle body frame via a suspension; and a driving unit configured to drive the tires, in which the vehicle body frame includes: a support that supports a suspension arm of the suspension; and a hollow part at least in the vicinity of the support, and the driving unit is fixed to the vehicle body frame while being housed in the hollow part of the vehicle body frame and supported by an inner surface of the hollow part.

In the above aspect of the invention, since the driving unit is housed in the hollow part of the vehicle body frame and is directly or indirectly supported by the inner surface of the hollow part, the hollow part of the vehicle body frame can be reinforced by the driving unit. Accordingly, unlike a typical dump truck, it is not necessary to house the driving unit in the axle housing, so that the axle housing can be eliminated to reduce a vehicle body weight. Moreover, since the hollow part in the vicinity of the suspension in the vehicle body frame is reinforced, it is not necessary to complicate the structure of the vehicle body frame in order to secure the rigidity thereof, so that the structure of the vehicle body frame can be simplified.

In the dump truck with the above arrangement, it is preferable that the vehicle body frame includes a vertical member standing upward, a lower end of which is connected to the vehicle body frame in the vicinity of the hollow part, and the body is mounted on a mount portion that is provided on an upper portion of the vertical member.

With this arrangement, since the vertical member is connected to the vicinity of the hollow part reinforced by the driving unit, a rigidity in the vicinity of a connecting portion of the vertical member can also be sufficiently secured. Accordingly, without complicating the structure of the vertical member in order to secure the rigidity thereof, the support for the suspension arm of the suspension can be provided to the vertical member.

In the dump truck with the above arrangement, it is preferable that the driving unit is supported by a projection that projects from the inner surface of the hollow part toward the driving unit.

With this arrangement, the surface of the driving unit can be supported by the inner surface of the hollow part through the projection even when a contour of the driving unit is smaller in size than the hollow part, so that the rigidity of the hollow part can be reliably secured.

In the dump truck with the above arrangement, it is preferable that the driving unit is an electric motor, the projection is provided by a plurality of projections spaced from each other in a circumferential direction of the inner surface, and the plurality of projections are configured to allow a passage of a cooling air for cooling the electric motor between the projections.

With this arrangement, since the electric motor is used as the driving unit, it is necessary to cool the electric motor generating heat during travelling. In an arrangement where the projection is positioned between the electric motor and the inner surface of the hollow part, there is a possibility that the projection disturbs flow of the cooling air. However, in the arrangement of the invention, since the plurality of projections are spaced from each other, the cooling air can flow between the projections to favorably cool the electric motor.

According to another aspect of the invention, a dump truck includes: a vehicle body frame; a body supported by the vehicle body frame and configured to be raised and lowered; tires provided to a first side and a second side of the vehicle body frame in a travel direction via a suspension; and an electric motor configured to drive the tires, the vehicle body frame including: a pair of front and back cross members extending in a vehicle width direction and provided at positions of the tires provided to the first side and the second side of the vehicle body frame in the travel direction in a side view; vertical members standing upward from both sides of each of the pair of front and back cross members in the vehicle width direction; and an upper cross member extending in the vehicle width direction in a manner to connect upper ends of the respective vertical members, in which the lower cross members each includes a hollow part, a support that supports a suspension arm of the suspension is provided on each end of each of the lower cross members and on a lower portion of each of the vertical members connected to each of the lower cross members, the electric motor is fixed to the vehicle body frame while being housed in the hollow part of each of the lower cross members and supported by an inner surface of the hollow part, and the body is mounted on a mount portion that is provided on the upper cross member.

According to the above aspect of the invention, the same functions and advantages as those of the dump truck in the above-described aspect of the invention can be obtained except for the above functions and advantages on cooling the electric motor.

DESCRIPTION OF EMBODIMENT(S)

Exemplary embodiment(s) of the invention will be described below with reference to the attached drawings.

Figure 1:
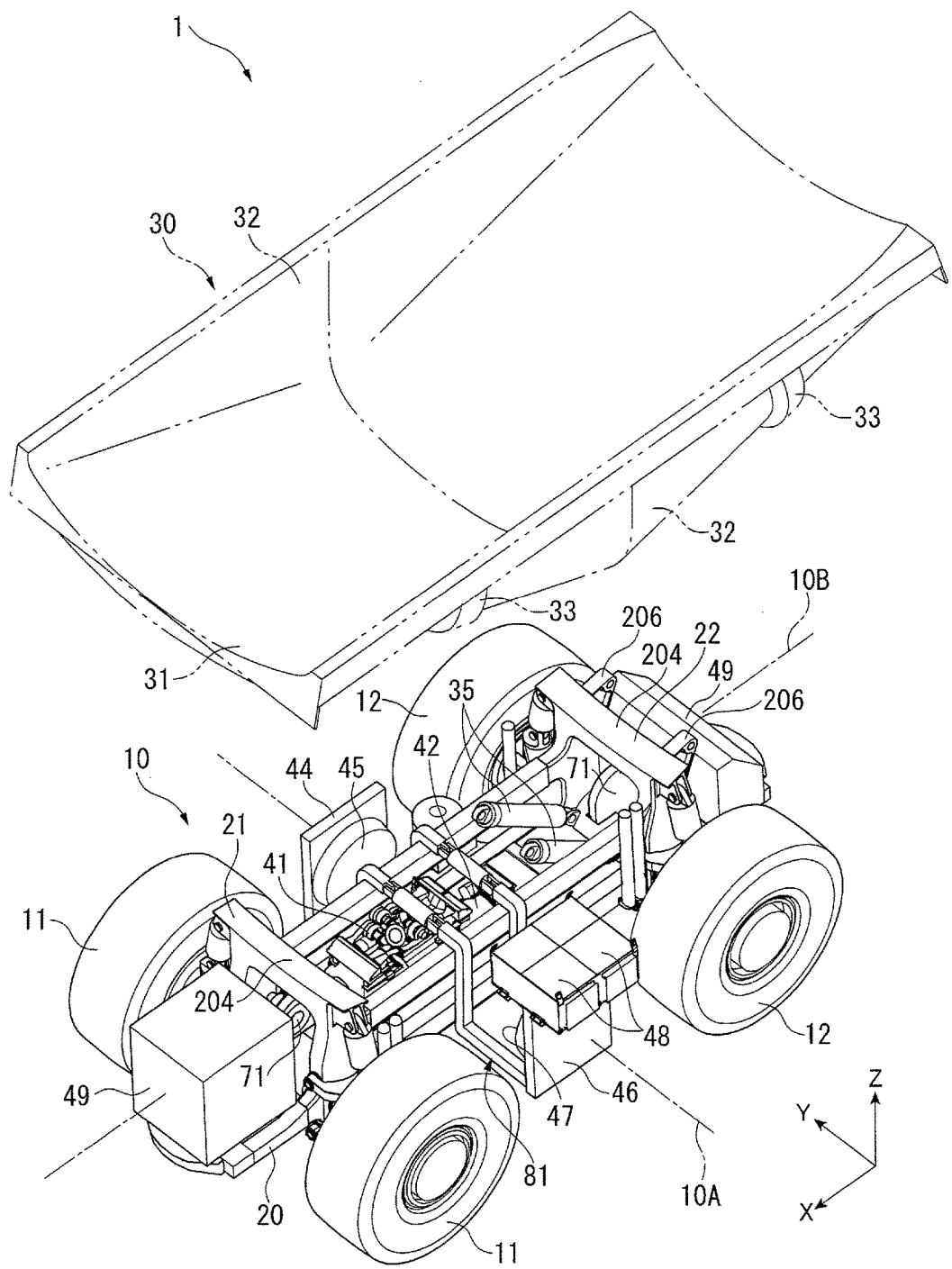
FIG. 1 is a partially-exploded perspective view of a dump truck according to an exemplary embodiment of the invention.
Figure 2:
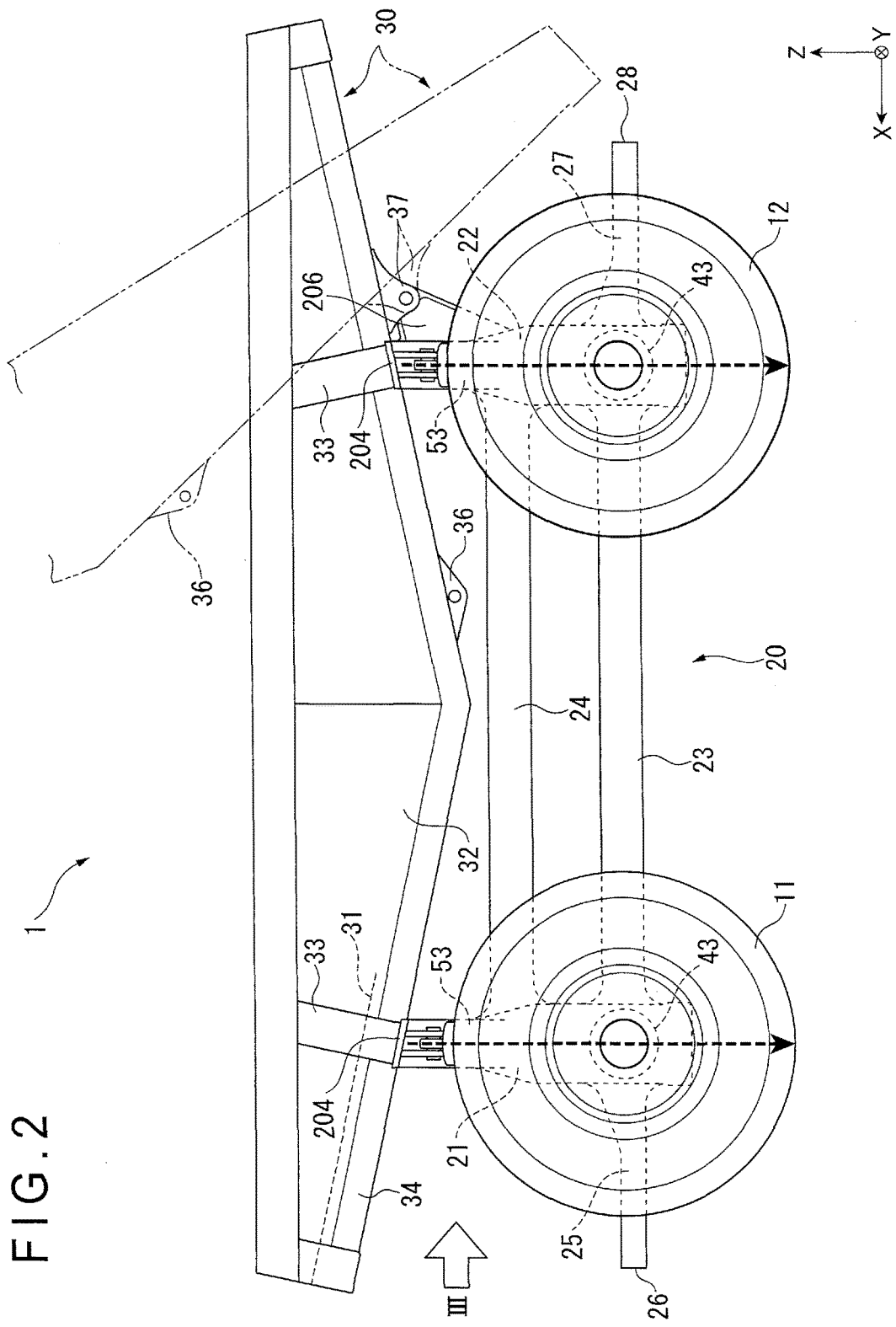
FIG. 2 is a side view of the dump truck.

FIGS. 1 to 4 are respectively a partially-exploded perspective view, a side view, an illustration of the dump truck in a travel direction, which is viewed in a direction indicated by an arrow III in FIG. 2, and a plan view of a dump truck according to an exemplary embodiment of the invention.

X, Y and Z axes in the drawings are orthogonal to each other in the exemplary embodiment. For convenience of the explanation, in the exemplary embodiment, with reference to FIG. 1, a first travel direction of the dump truck 1 is defined as an arrow direction of the X axis while a second travel direction thereof is defined as an opposite direction of the arrow direction of the X axis, a first vehicle width direction of the dump truck 1 is defined as an arrow direction of the Y axis while a second vehicle width direction thereof is defined as an opposite direction of the arrow direction of the Y axis, and a first vertical direction of the dump truck 1 is defined as an arrow direction of the Z axis while a second vertical direction thereof is defined as an opposite direction of the arrow direction of the Z axis. Moreover, in the following exemplary embodiment, the first travel direction, the second travel direction, the first vehicle width direction and the second vehicle width direction are sometimes respectively referred to as "front," "rear (back)," "right" and "left".

Overall Description of Dump Truck

As shown in FIG. 1, a dump truck 1 is a driverless off-road dump truck configured to travel by remote control. For instance, the dump truck 1 is a vehicle working at a mining site for developing mines. The remote control is performed fully using information communication technology such as a communication means set at a control center and the dump truck 1 and GPS (Global Positioning System).

The dump truck 1 includes a vehicle body 10 configured to travel with use of a pair of left and right tires 11, 11 and a pair of left and right tires 12, 12, the tires 11, 11 being set on both vehicle-width-directional sides of the vehicle body 10 in the first travel direction, the tires 12, 12 being set on both vehicle-width-directional sides of the vehicle body 10 in the second travel direction. The vehicle body 10 includes: a vehicle body frame 20 extending along the travel direction and to which the tires 11, 12 are provided; a load-carrying body 30 that is supported by the vehicle body frame 20 and configured to be raised and lowered (see a two-dot chain line in FIG. 2; devices 41 to 49 mounted on the vehicle body frame 20; a suspension 50 by which the tires 11, 12 are suspended from the vehicle body frame 20; and a steering mechanism. The dump truck 1, which is a vehicle dedicated for remote control, does not include a cab for a driver to operate, which is provided in a typical dump truck.

Explanation of Vehicle Body Frame

The vehicle body frame 20 will be described in details below.

Figure 3:
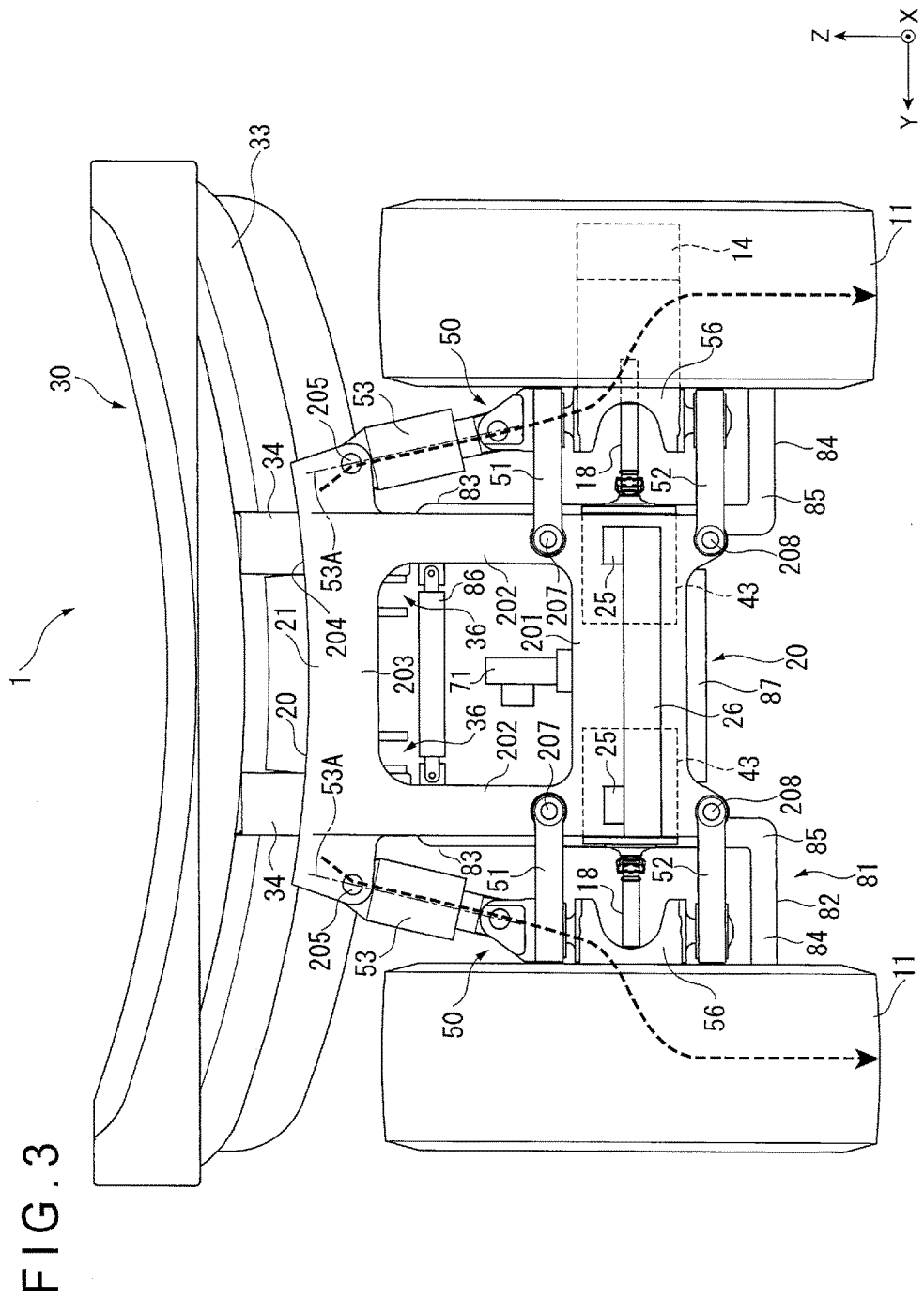
FIG. 3 is an illustration of the dump truck in a travel direction, which is viewed in a direction indicated by an arrow III in FIG. 2.
Figure 4:
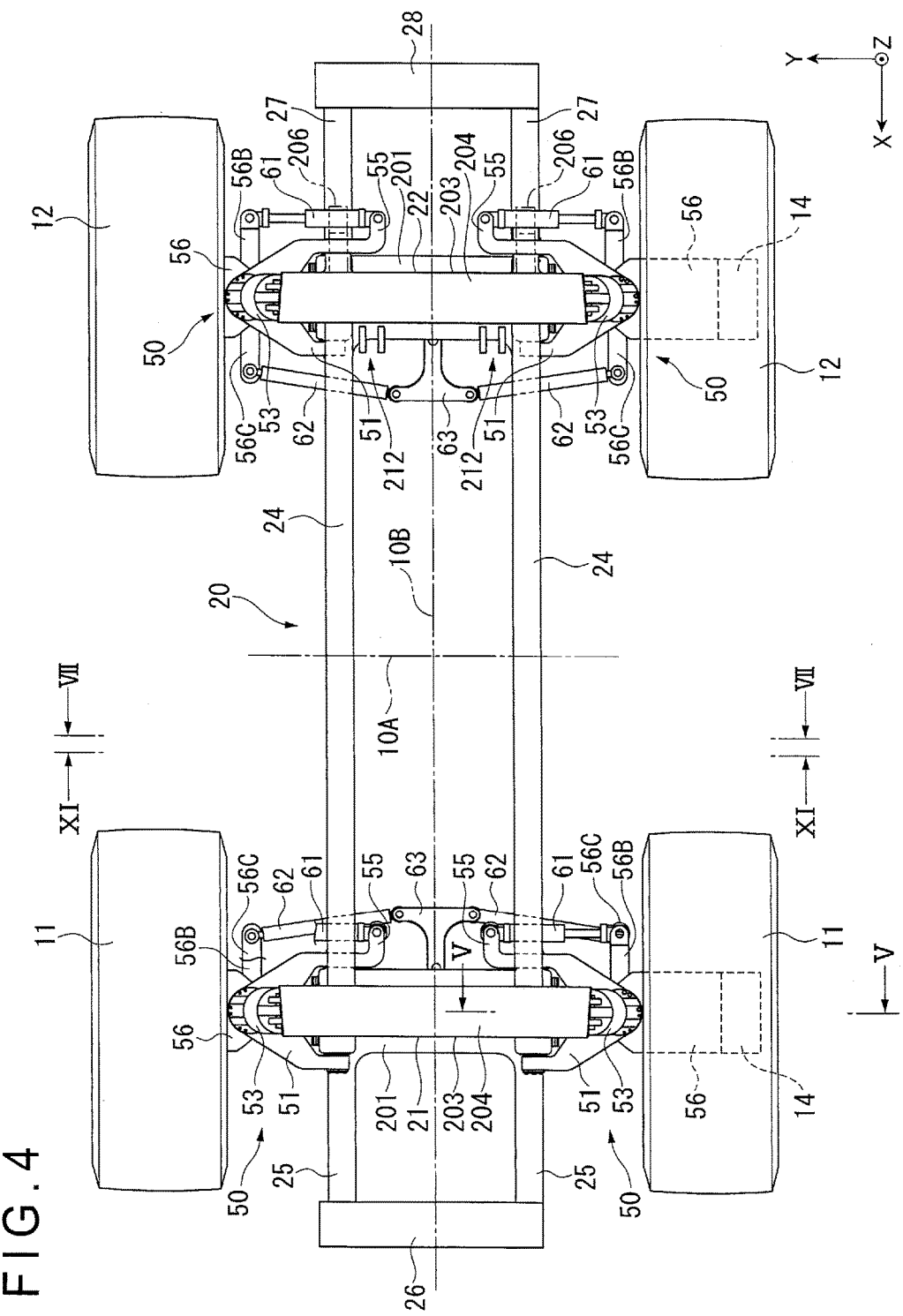
FIG. 4 is a plan view of the dump truck.

As shown in FIGS. 2 to 4, the vehicle body frame 20 includes: a lower cross member 201 provided at positions of the right and left tires 11 in the first travel direction (i.e., the right and left tires 11 provided to a first side of the vehicle body frame 20 in the travel direction) and extending in the vehicle width direction; a pair of right and left vertical members 202, 202 standing upward on both ends of the lower cross member 201; and an upper cross member 203 extending in the vehicle width direction in a manner to connect upper ends of the respective vertical members 202. Among the above members, the pair of vertical members 202 and the upper cross member 203 define a first vertical frame 21 that vertically stands at the positions of the right and left tires 11 and has a portal shape viewed in the travel direction of the vehicle body 10 (see FIG. 3).

In other words, the vehicle body frame 20 includes the first vertical frame 21 that vertically stands in a side view at the positions of the tires 11 provided to the first side of the vehicle body frame 20 in the travel direction.

The vehicle body frame 20 also includes: the lower cross member 201 provided at positions of the right and left tires 12 in the second travel direction (i.e., the right and left tires 12 provided to a second side of the vehicle body frame 20 in the travel direction) and extending in the vehicle width direction; a pair of right and left vertical members 202, 202 standing upward on both ends of the lower cross member 201; and an upper cross member 203 extending in the vehicle width direction in a manner to connect upper ends of the respective vertical members 202. Among the above members, the pair of vertical members 202 and the upper cross member 203 define a second vertical frame 22 that vertically stands at the positions of the right and left tires 12 and has a portal shape viewed in the travel direction of the vehicle body 10.

In other words, the vehicle body frame 20 includes the second vertical frame 22 that vertically stands in a side view at the positions of the tires 12 provided to the second side of the vehicle body frame 20 in the travel direction.

The first vertical frame 21 and the second vertical frame 22 have substantially the same shape.

Ends of the front lower cross member 201 are connected to ends of the back lower cross member 201 by a pair of right and left lower side members 23, 23 disposed in parallel to each other in the travel direction and spaced from each other in the vehicle width direction. A vertical middle of the first vertical frame 21 is connected to a vertical middle of the second vertical frame 22 by a pair of right and left upper side members 24, 24 positioned above the lower side members 23, 23 (see FIG. 2).

Side members 25, 25 of a short length, which are respectively positioned on extension lines of the lower side members 23, 23, extend in the first travel direction from a lower portion of the first vertical frame 21. Ends of the respective side members 25, 25 are connected by a cross member 26. Side members 27, 27 of a short length, which are respectively positioned on extension lines of the lower side members 23, 23, extend in the second travel direction from a lower portion of the second vertical frame 22. Ends of the respective side members 27, 27 are connected by a cross member 28 along the vehicle width direction (see FIG. 4).

Figure 5:
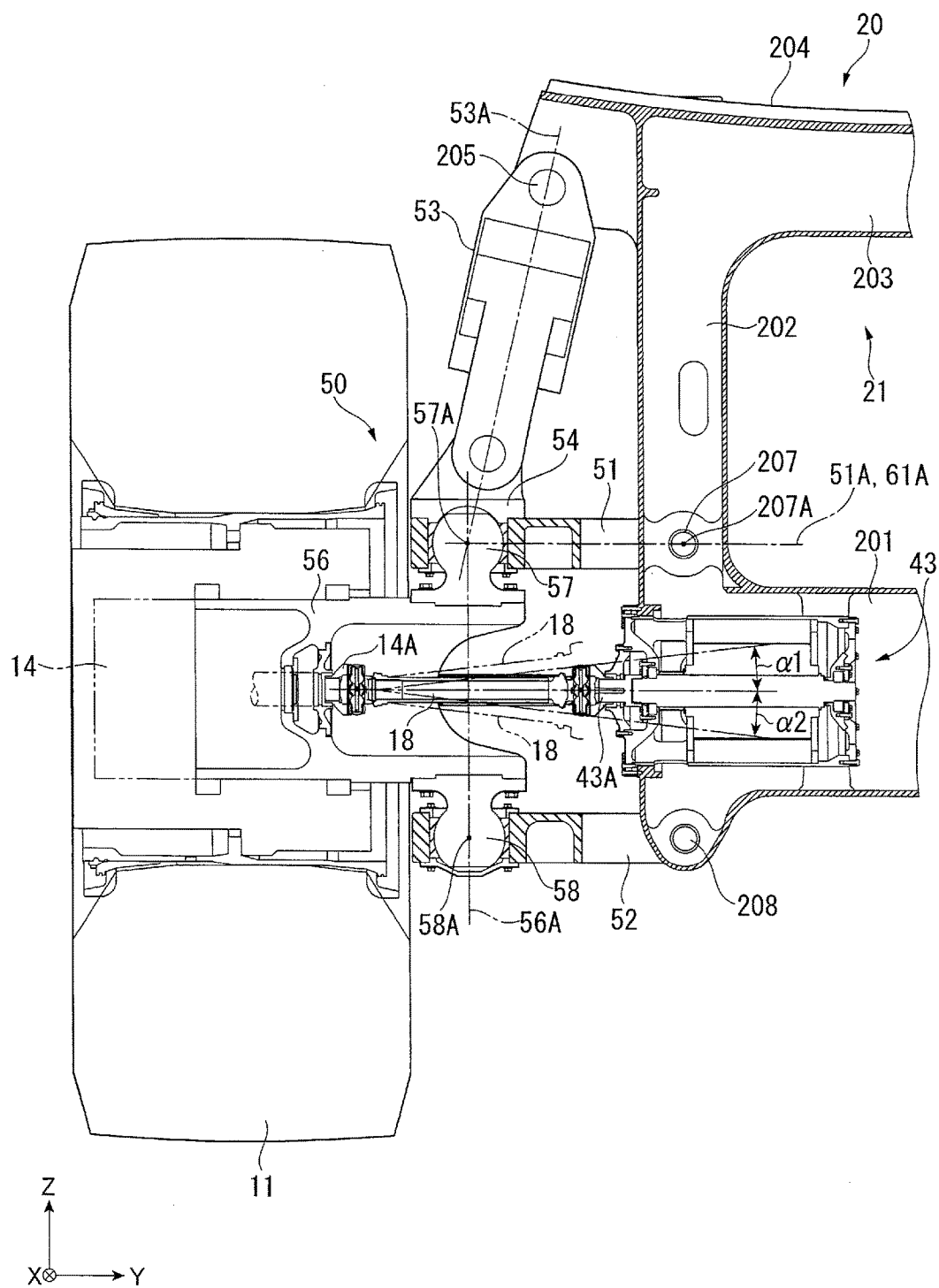
FIG. 5 is a cross-sectional view showing a suspension, which is viewed in a direction indicated by an arrow V-V in FIG. 4.

As shown in FIGS. 3 and 5, the lower cross member 201 on which the first vertical frame 21 stands is shaped in a hollow cylinder. Electric motors 43, 43 (driving unit) configured to independently respectively drive the tires 11, 11 via a drive shaft 18 are housed at both sides of an inside of the lower cross member 201. In the exemplary embodiment in which all the tires 11, 12 are to be driven, a pair of electric motors 43, 43 are also housed in the same manner as the above within the lower cross member 201 on which the second vertical frame 22 stands and are configured to independently respectively drive the tires 12. A final reduction gear 14 (a planet gear mechanism) is disposed between an end of the drive shaft 18 and a tire wheel.

An upper surface of the upper cross member 203 defining an upper portion of the first vertical frame 21 and an upper portion of the second vertical frame 22 is defined as a mount portion 204 that is a concave curve with a predetermined curvature. The body 30 is mounted only on the mount portion 204. A suspension support 205 supporting an upper end of a suspension cylinder 53 (a part of the suspension 50) is provided at each end of the upper cross member 203. A lower end of the suspension cylinder 53 is connected to an upper arm 51 (a part of the suspension 50). With this arrangement, the mount portion 204 is positioned on an axial line 53A of the suspension cylinder 53 configured to transmit a load downward (see FIG. 3).

The suspension 50 will be described later.

Herein, the load to be transmitted to a road surface through the tires 11, 12 includes a carrying load and a vehicle body load. The carrying load means a load defined by a weight of the body 30 loaded with goods. The vehicle body load means a load defined by a weight of the vehicle body 10 excluding weights of the tires 11, 12 and the body 30. In the exemplary embodiment, the vehicle body load and the carrying load are sometimes collectively referred to as an entire load.

Accordingly, the carrying load is transmitted from the mount portion 204 to the road surface through the suspension 50 (including the suspension cylinder 53) beneath the mount portion 204 and the tires 11, 12. Thus, the carrying load is transmitted through a short and simple transmission path (see dotted lines in FIGS. 2 and 3). In other words, the carrying load is transmitted without acting on the upper side member 24, the lower side member 23 and the like.

A shape of the entire vehicle body frame 20 is substantially plane-symmetrical to a vertical plane including a first center line 10A passing through the middle between the front tires 11 and the rear tires 12 and extending in the vehicle width direction, while being substantially plane-symmetrical to a vertical plane including a second center line 10B being orthogonal to the first center line 10A and extending in the travel direction through the middle between the tires in the vehicle width direction (see FIGS. 1 and 4).

Figure 9:
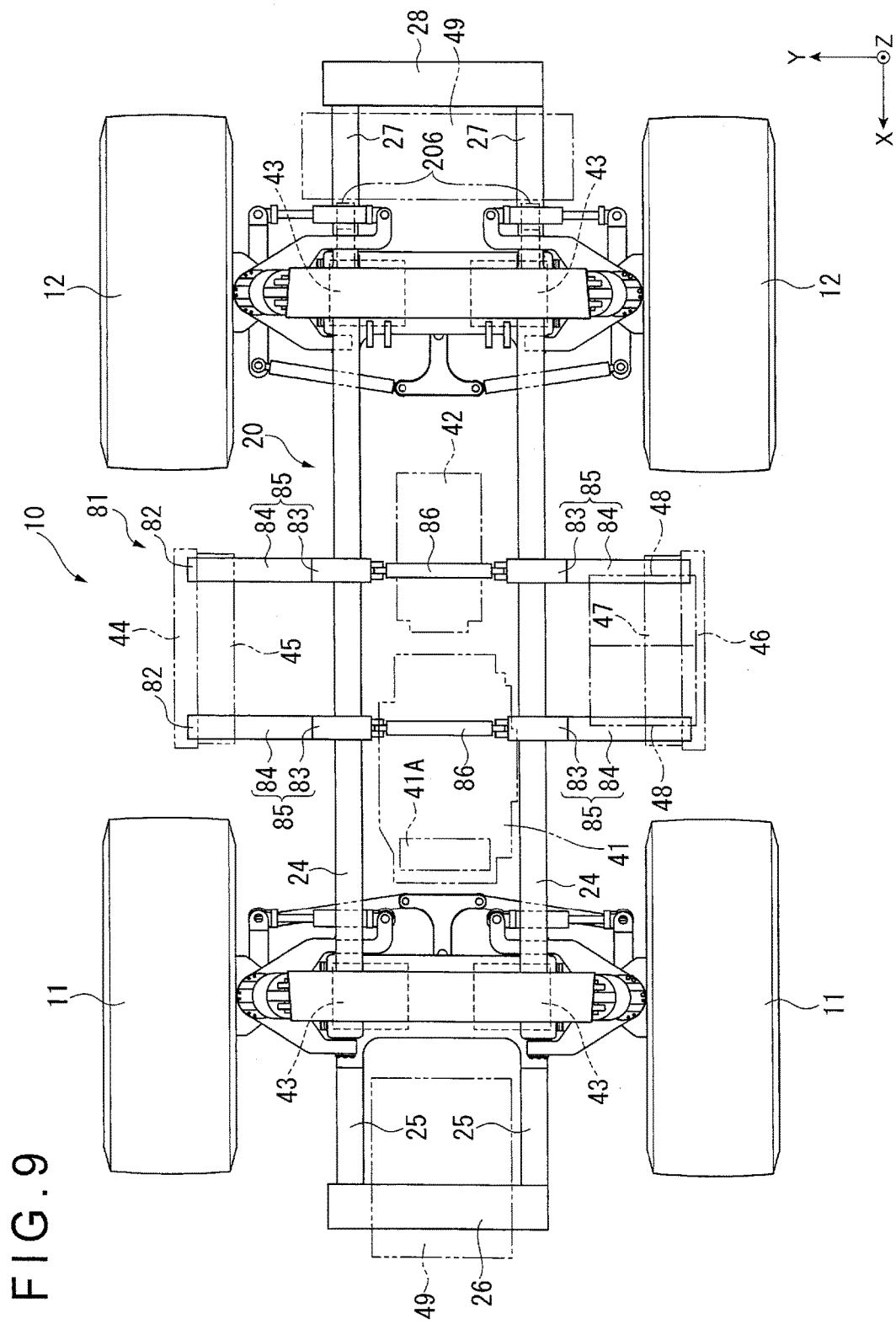
FIG. 9 is a plan view showing a layout of devices.
Figure 10:
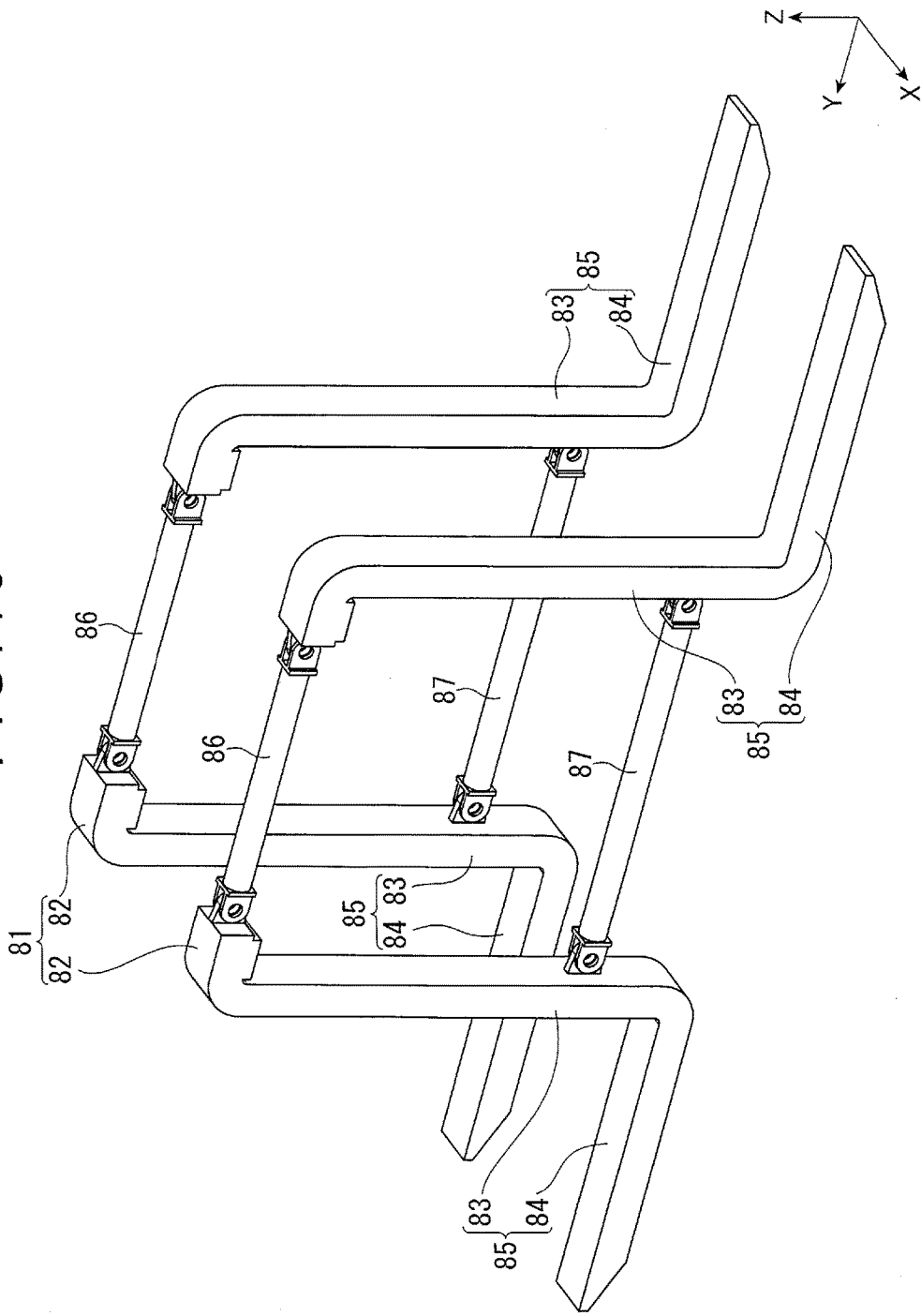
FIG. 10 is a perspective view showing an overall support frame.

Moreover, a support frame 81 is provided on the first center line 10A in the vehicle body frame 20 in a manner to bridge over the vehicle body frame 20 in the vehicle width direction. The support frame 81 is provided for supporting the devices 44 to 48 on the vehicle body frame 20. As shown in FIGS. 1, 9 and 10, the support frame 81 includes a pair of front and back sub frames 82 spaced from each other in the travel direction. The entire support frame 81 is shaped in a form of a saddle. Both sides of the support frame 81 project between the pair of front and back tires 11 and 12 on both the right and left sides of the vehicle body frame 20. Accordingly, the devices 44 to 48 supported by the support frame 81 are also disposed between the pair of front and back tires 11 and 12.

Specific disposition of the devices 44 to 48 will be described later.

Each of the sub frames 82 includes: a pair of right and left L-shaped frames 85 each including vertical portions 83 that are each fixed to the lower side member 23 and the upper side member 24 at both sides of the vehicle width direction and extensions 84 respectively horizontally extending toward the outside of the vehicle body frame 20 from lower ends of both the vertical portions 83 in the vehicle width direction; an upper connecting portion 86 connecting upper ends of the vertical portions 83 of the pair of right and left L-shaped frames 85 above the upper side member 24; and a lower connecting portion 87 connecting the respective lower ends of the vertical portions 83 of the pair of right and left L-shaped frames 85 under the lower side member 23.

The L-shaped frames 85 are detachably fixed to the lower side members 23 and the upper side member 24s with an unillustrated fastening unit (e.g., a bolt). The upper ends of the vertical portions 83 in each of the L-shaped frames 85 are detachably connected to the upper connecting portion 86 with a pin. The lower ends of the vertical portions 83 in each of the L-shaped frames 85 are detachably connected to the lower connecting portion 87 with a pin. Accordingly, the connection of each of the L-shaped frames 85 to the connecting portions 86 and 87 is provided by a flexible connection with a pin while each of the L-shaped frames 85 to the vehicle body frame 20 is kept firmly fixed, so that the L-shaped frames 85 can favorably tolerate torsion or the like of the vehicle body frame 20.

Explanation of Body

As shown in FIGS. 1 to 3, a depth of the body 30 is the maximum at a middle portion thereof in the travel direction and is decreased toward both the sides thereof in the travel direction and both the sides thereof in the vehicle width direction. Specifically, the body 30 include: a slant bottom 31 that defines the depth deeper toward the middle of the body 30; and side faces 32, 32 that guard respective edges of longer sides of the bottom 31 in the travel direction. On slant parts, which are slant in different directions, of a lower surface of the bottom 31, horizontal ribs 33, 33 are provided in a manner to traverse the slant parts in the vehicle width direction and so that ends of each of the horizontal ribs 33, 33 extend to outer faces of the side faces 32, 32. The horizontal ribs 33 are mounted on the respective mount portions 204 of the first vertical frame 21 and the second vertical frame 22. Each of the horizontal ribs 33 is curved at the same curvature as that of the mount portion 204 so that the horizontal ribs 33 are respectively in close contact with the mount portions 204. Moreover, a pair of vertical ribs 34, 34 are provided in parallel in the travel direction on the lower surface of the bottom 31. The body 30 is mounted on the mount portion 204 at positions where the vertical ribs 34 intersect with the horizontal ribs 33 (see FIGS. 2 and 3).

Figure 11:
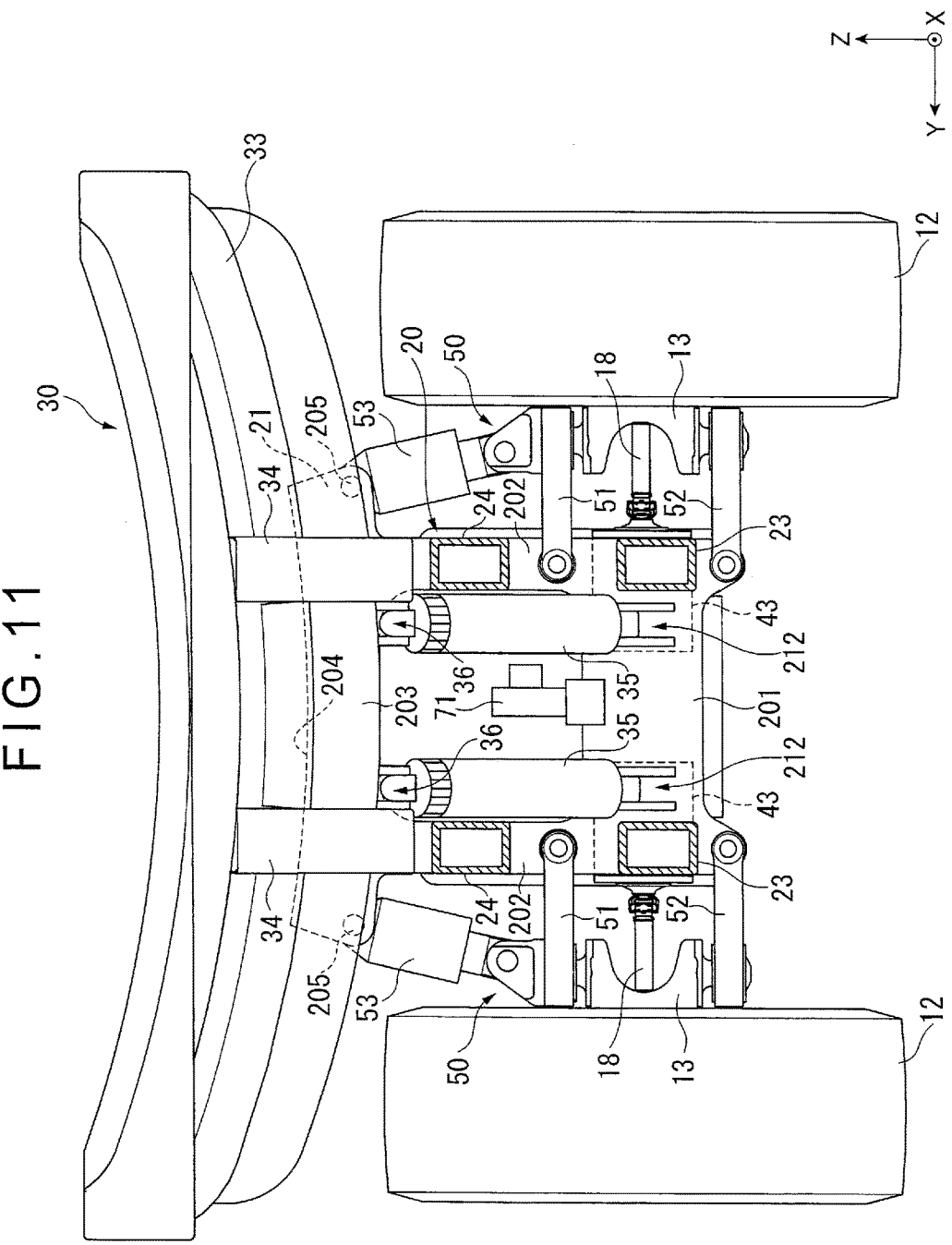
FIG. 11 is an illustration of an attachment position of a hoist cylinder in the travel direction, which is viewed in a direction indicated by an arrow XI-XI in FIG. 4.
Figure 12:
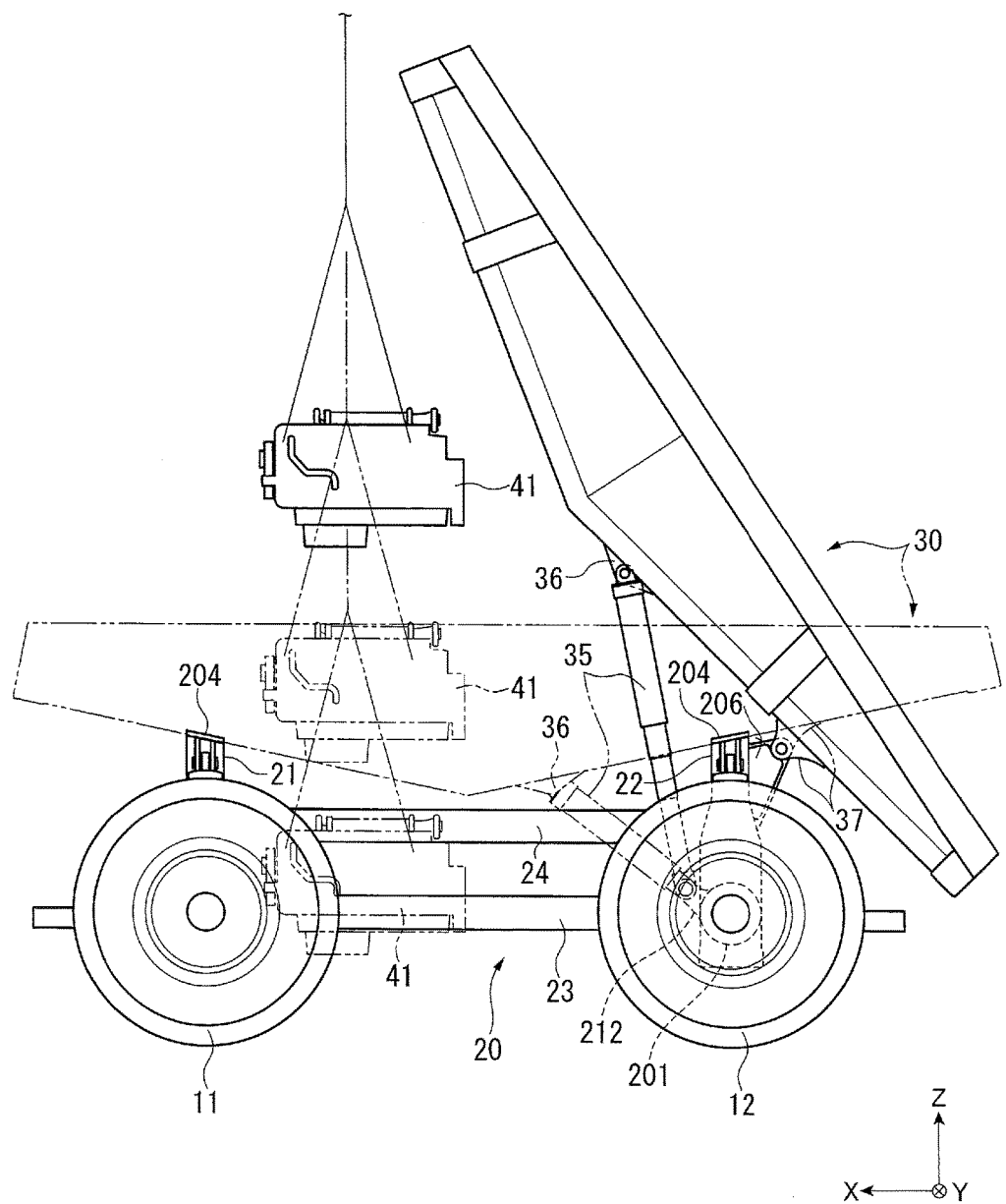
FIG. 12 is a side view showing the attachment position of the hoist cylinder.

Respective attachment portions 36, 36 to which upper ends of a pair of hoist cylinders 35, 35 are attached are provided on one of the slant parts of the lower surface of the bottom 31 (see FIGS. 1, 11 and 12). The hoist cylinders 35 are hydraulic actuators for raising and lowering the body 30. Lower ends of the hoist cylinders 35 are attached to the lower cross member 201 on which the second vertical frame 22 stands. In the middle of the one of the slant parts, a pair of pivot shafts 37, 37 connecting the body 30 to the vehicle body frame 20 so that the body 30 is pivotable are provided (only one of the pivot shafts 37, 37 is shown in FIGS. 2 and 12). The pivot shafts 37 are respectively supported on body supports 206, 206 extending from upper portions of the vertical members 202 to the upper cross member 203. Since the second vertical frame 22 stands at the position of the right and left tires 12 in a side view, in terms of the support position of the body 30 in the travel direction, the body 30 is supported on the vehicle body frame 20 at the position of the right and left tires 12 through the body support 206.

A shape of the entire body 30 is also substantially plane-symmetrical to the above-described vertical plane including the first center line 10A and substantially plane-symmetrical to the above-described vertical plane including the second center line 10B (see FIG. 1). The body 30 is mounted in the middle of the vehicle body frame 20 that is plane-symmetrical to the vertical plane including the first center line 10A and the second center line 10B. Consequently, a load distribution of the carrying load to be transmitted from the mount portion 204 of the vehicle body frame 20 to the tires 11 and 12 becomes equal. In other words, an entire load obtained by combining the vehicle load and the carrying load is transmitted to the tires 11, 12 at an even load distribution.

Explanation of Devices

Main devices shown in FIG. 1 are an engine 41, a generator motor 42 and a hydraulic pump (not shown) configured to be driven by an output of the engine 41, an electric motor 43 configured to be driven by electric energy generated by the generator motor 42 (see FIGS. 2 and 3), a first radiator 44 configured to radiate heat of a cooling water of the engine 41, a first cooling fan 45 configured to supply a cooling air to the first radiator 44, a second radiator 46 for a water-cooling type aftercooler 41A (see FIG. 9) configured to cool charge air delivered from an air cleaner through a supercharger to the engine 41, a second cooling fan 47 configured to supply a cooling air to the second radiator 46, a pair of brake resistors 48, 48 configured to convert kinetic energy of the tires 11, 12 to electric energy to generate Joule heat, a hydraulic fluid tank (not shown) configured to store a hydraulic fluid pumped from the hydraulic pump, and a pair of front and rear controllers 49, 49 configured to totally control travel of the dump truck 1.

Specific disposition of the devices 41 to 49 will be described later.

Explanation of Suspension

FIG. 5 is a cross-sectional view showing the suspension 50, which is viewed in a direction indicated by an arrow V-V in FIG. 4.

As shown in FIGS. 3 to 5, an independent double-wishbone-type suspension is employed as the suspension 50. The suspension 50 includes: substantially horizontal upper arm 51 and lower arm 52 each having vertically movable proximal ends supported by the vehicle body frame 20; a cylindrical casing 56 having an upper portion rotatably connected to a distal end of the upper arm 51 and a lower portion rotatably connected to a distal end of the lower arm 52; and a suspension cylinder 53 having an upper end rotatably connected to the vehicle body frame 20 and a lower end rotatably connected to the upper arm 51. The suspension cylinder 53 absorbs and attenuates impacts to the tires 11, 12 while transmitting the vehicle body load and the carrying load to the tires 11, 12. The casing 56 rotates and supports the tires 11, 12 through a final reduction gear 14.

Specifically, a pair of proximal ends of the upper arms 51 (i.e., one of a suspension arm) having a bifurcated shape in a plan view are rotatably supported by an upper support 207 provided on a lower portion of the vertical member 202 of each of the first vertical frame 21 and the second vertical frame 22. A pair of proximal ends of the lower arm 52 (i.e., the other of a suspension arm) having a bifurcated shape in a plan view are rotatably supported by a lower support 208 provided on a lower end of the lower cross member 201 on which each of the first vertical frame 21 and the second vertical frame 22 stands.

A distal end of the upper arm 51 is connected to an upper ball joint 57 provided to the upper portion of the casing 56. A distal end of the lower arm 52 is connected to a lower ball joint 58 provided to the lower portion of the casing 56. A top of the upper ball joint 57 is covered with a connecting bracket 54 fixed to an upper surface of the upper arm 51. The connecting bracket 54 is connected by the suspension cylinder 53 to the suspension support 205 of each of the first vertical frame 21 and the second vertical frame 22. At this time, the lower end of the suspension cylinder 53 is connected to the connecting bracket 54 at a position very close to the upper ball joint 57.

A king pin shaft 56A connecting a rotation center 57A of the upper ball joint 57 to a rotation center 58A of the lower ball joint 58 intersects with an axial line 53A of the suspension cylinder 53 at a connecting portion of the upper ball joint 57 of the casing 56 and the upper arm 51, specifically, within a range of a ball diameter of the upper ball joint 57, more specifically at a rotation center 57A of the upper ball joint 57 and the upper arm 51. Accordingly, the vehicle body load and the carrying load to be transmitted through the suspension cylinder 53 hardly act on the upper arm 51, but are transmitted to the tires 11, 12 through the casing 56 to which the upper ball joint 57 is provided. Consequently, since the carrying load is not transmitted to the upper arm 51 and the lower arm 52, respective structures of the upper arm 51 and the lower arm 52 can be simplified.

Herein, when the vehicle body 10 is vertically moved along with the vertical motion of the upper arm 51 and the lower arm 52, a positional relationship between the tires 11, 12 and the electric motor 43 is slightly shifted. The drive shaft 18 is connected to an output shaft 43A of the electric motor 43 and an input shaft 14A of the final reduction gear 14 via a universal joint in order to absorb the shift of the tires 11, 12 from the electric motor 43, and is structured in such a slide type that the drive shaft 18 is extendable and contractible in an axial direction in order to absorb a changed amount of a distance between the vehicle body frame 20 and the casing 56 to be generated when the tires 11, 12 vertically move.

Figure 6:
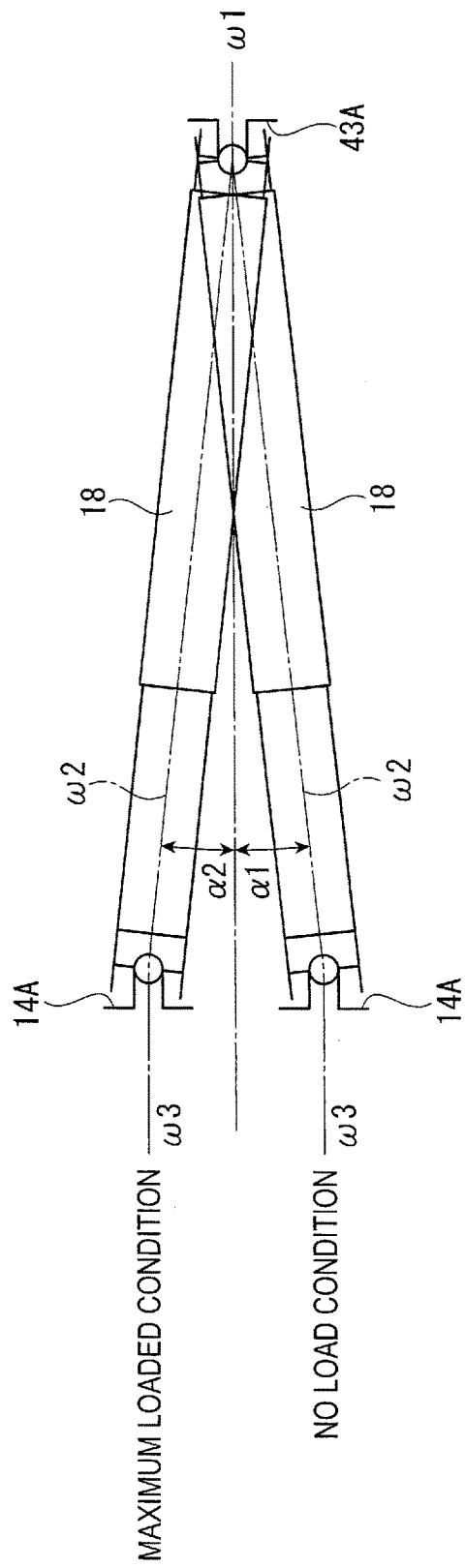
FIG. 6 is a schematic illustration for explaining an intersection angle.

Although the drive shaft 18 is shown horizontal in FIG. 5 for convenience, when no load is placed in the body 30, as shown in FIG. 6, the drive shaft 18 is actually inclined at an intersection angle $\alpha 1$ relative to the horizon with a distal end of the drive shaft 18 near the tire 11 facing downward. On the other hand, when the maximum load within the allowable load is placed in the body 30, the drive shaft 18 is inclined at an intersection angle $\alpha 2$ relative to the horizon with the distal end of the drive shaft 18 near the tire 11 facing upward. The intersection angles $\alpha 1$ and $\alpha 2$ are preferably in a range from 2.5 degrees to 3.5 degrees. In the exemplary embodiment, both of the intersection angles $\alpha 1$ and $\alpha 2$ are approximately 3 degrees. The intersection angles $\alpha 1$ and $\alpha 2$ are set by adjusting a strength of the suspension cylinder 53 or adjusting a distance between the connecting bracket 54 and the suspension support 205 that are connected by the suspension cylinder 53.

With the above arrangement, a change in the inclination angle of the drive shaft 18 relative to the horizon between when the load is placed and when no load is placed can be decreased, thereby inhibiting torsional vibration of the drive shaft 18 during travelling. For instance, if the drive shaft 18 is arranged to be horizontal at the intersection angle $\alpha 1$ of zero degree when no load is placed, the drive shaft 18 becomes largely inclined relative to the horizon at an angle close to the intersection angle $\alpha 2$ of about 6 degrees when the maximum load is placed, so that the torsional vibration during travelling is increased to reduce durability. In other words, when the drive shaft 18 is largely inclined, even during a constant speed travelling in which an angular speed $\omega 1$ of the output shaft 43A and an angular speed $\omega 3$ of the input shaft 14A are kept constant, an angular speed $\omega 2$ of the drive shaft 18 is changed depending on the size of the intersection angles $\alpha 1$ and $\alpha 2$, resulting in generation of torsional vibration. In the exemplary embodiment, such generation of torsional vibration can be inhibited to improve durability and the above-described universal joint can be employed well instead of an expensive constant-velocity joint capable of absorbing a large inclination angle.

Incidentally, for the sake of an easy understanding of the intersection angles $\alpha 1$ and $\alpha 2$, the intersection angles $\alpha 1$ and $\alpha 2$ are exaggeratingly shown in FIG. 6 to be larger than the actual angles.

Explanation of Steering Mechanism

Figure 7:
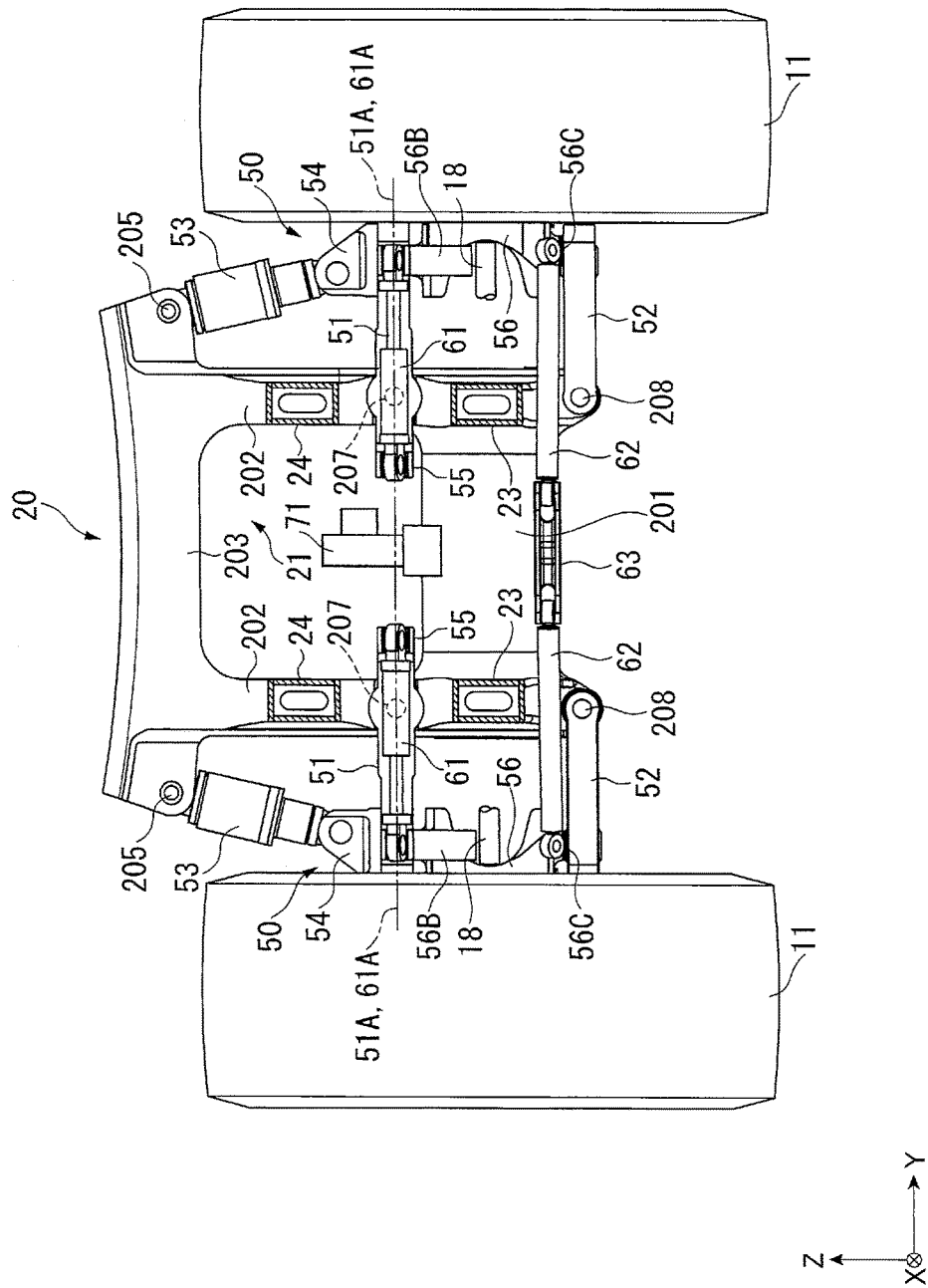
FIG. 7 is a cross-sectional view showing a steering mechanism, which is viewed in a direction indicated by an arrow VII-VII in FIG. 4.

FIG. 7 is a cross-sectional view showing the steering mechanism, which is viewed in a direction indicated by an arrow VII-VII in FIG. 4.

As shown in FIGS. 4 and 7, the steering mechanism is configured to move all the tires 11 and 12 using respective steering cylinders 61. The steering mechanism includes the steering cylinders 61 each having a proximal end attached to the upper arm 51 and a distal end attached to the casing 56.

Specifically, the bifurcated upper arm 51 integrally includes a cylinder attachment arm 55 having an L shape in a plan view. The cylinder attachment arm 55 horizontally extends inward from one of the proximal ends of the upper arm 51 to extend over the upper support 207 on the vertical member 202. Moreover, the casing 56 integrally includes a knuckle arm 56B extending in the same direction as the distal end of the cylinder attachment arm 55 in the plan view. The proximal end of the steering cylinder 61 is attached to the cylinder attachment arm 55 while the distal end of the steering cylinder 61 is attached to the knuckle arm 56B.

Moreover, a steering arm 56C extending in the travel direction in the plan view is integrally formed to the lower portion of the casing 56. The steering arm 56C includes first and second steering arms 56C in the vehicle width direction. The first and second steering arms 56C are connected by a pair of tie rods 62, 62 (on the sides) and a bell crank 63 (in the middle). By advancing and retracting each of the steering cylinders 61, the tires 11, 12 with the respective casings 56 are steered around the king pin shaft 56A via the knuckle arm 56B. This movement is mutually transmitted to the casings 56 in pair via the tie rods 62 and the bell crank 63, so that both the tires 11 (12) are steered in conjunction with each other.

Further, a distal end of the knuckle arm 56B is bent upward. A height of a connecting portion between the knuckle arm 56B and the steering cylinder 61 is set substantially the same as a height of the rotation center of the upper arm 51 and the casing 56, specifically, a height of the rotation center 57A of the upper ball joint 57. Accordingly, viewed in the travel direction, an axial line 61A of the steering cylinder 61 overlaps a line 51A passing through the rotation center 57A and traversing a motion center 207A of the upper arm 51 on the upper support 207. The respective vertical motions of the upper arm 51 and the steering cylinder 61 are exactly the same. Accordingly, respective vertical motion regions to be required for the upper arm 51 and the steering cylinder 61 to vertically move are the same when viewed in the travel direction (see FIGS. 5 and 7).

In this arrangement, the steering cylinder 61 is disposed adjacent to the lower cross member 201 along the vehicle width direction. On the lower cross member 201 near the second vertical frame 22, in other words, on the lower cross member 201 supporting the lower end of the hoist cylinder 35, the steering cylinder 61 is disposed opposite the hoist cylinder 35 in the travel direction across the lower cross member 201, in order to avoid interference with the hoist cylinder 35.

In the exemplary embodiment, since the proximal end of the steering cylinder 61 is attached not to the vehicle body frame 20 but to the cylinder attachment arm 55 integrated with the upper arm 51, even when the suspension 50 including the upper arm 51 is operated, a distance between the knuckle arm 56B and the cylinder attachment arm 55 of the upper arm 51 is hardly changed. Accordingly, a relationship between steering amounts of the respective tires 11, 12 and advancing and retracting amounts of the respective steering cylinders 61 becomes clear, so that advancing or retracting of the steering cylinders 61 for obtaining desired steering amounts of the steering cylinders 61 can be easily controlled.

Explanation of Support Structure and Cooling Structure of Electric Motor

Figure 8:
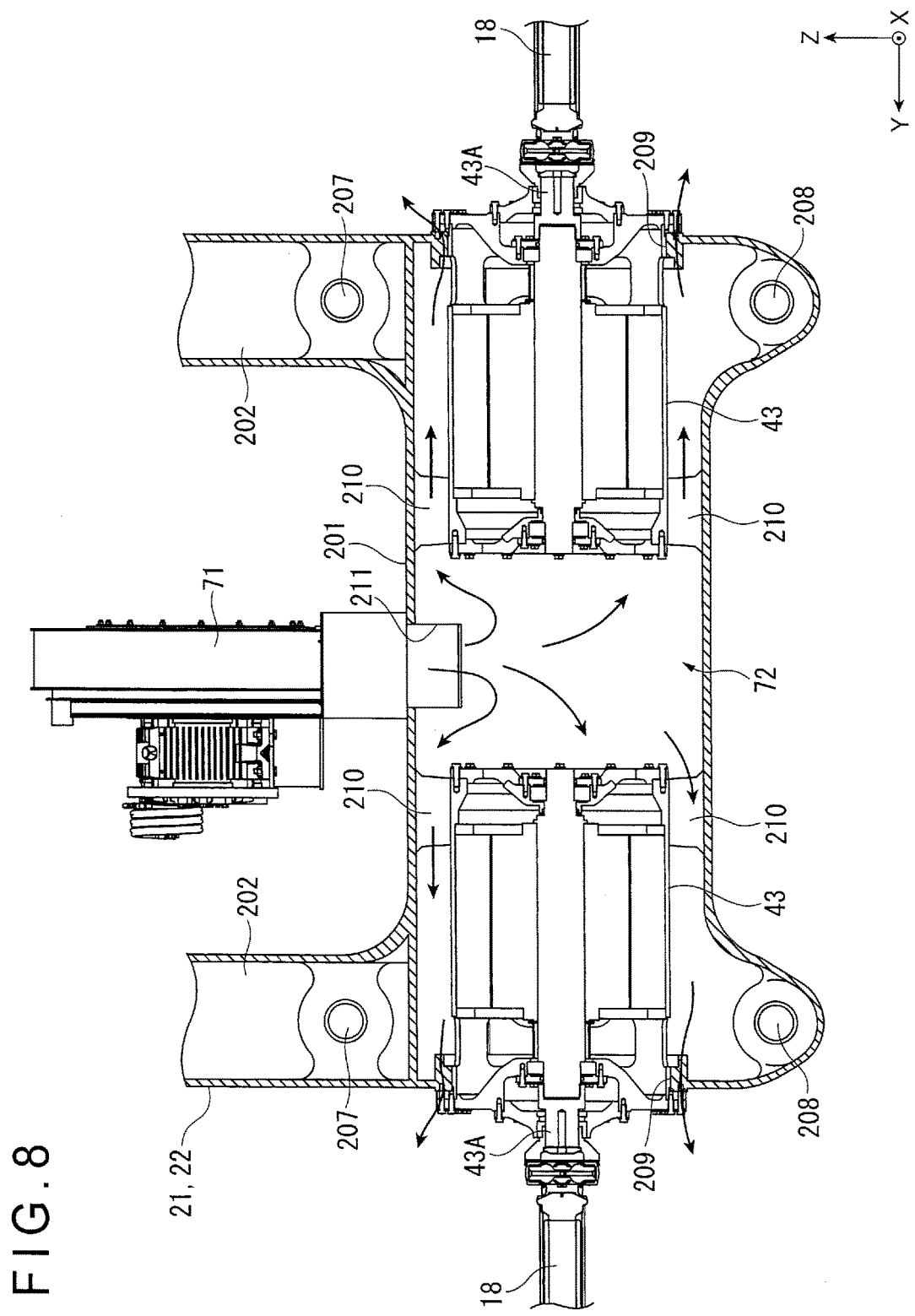
FIG. 8 is a cross-sectional view showing a support structure and a cooling structure of an electric motor.

FIG. 8 is a cross-sectional view showing a support structure and a cooling structure of the electric motor 43.

As shown in FIG. 8, the electric motors 43 are housed in both sides of a hollow portion of the lower cross member 201 on which each of the first vertical frame 21 and the second vertical frame 22 stands. Openings 209 are provided on both sides of the lower cross member 201. Each end of a body of the electric motors 43 close to the output shaft 43A is fixed around each of the openings 209 by an appropriate fastening unit.

Inside the lower cross member 201, a projection 210 projects from an inner surface of the hollow portion toward each of the electric motors 43. Accordingly, an end of each of the electric motors 43 opposite the output shaft 43A is supported by the inner surface of the hollow portion through the projection 210. The projection 210 is provided by a plurality of projections spaced from each other in a circumferential direction. Since the electric motors 43 are housed inside the lower cross member 201 and fixed to the lower cross member 201, the lower cross member 201 itself is reinforced by the electric motors 43, so that rigidity of the lower cross member 201 is improved.

An inflow port 211 for taking in a cooling air is provided on a center top of the lower cross member 201 in the vehicle width direction. A cooling blower 71 is attached at a position corresponding to the inflow port 211. Moreover, a predetermined gap (not shown) for discharging the cooling air to the outside is formed at each of fastening parts between the electric motors 43 and both the sides of the lower cross member 201. The cooling air supplied from the cooling blower 71 flows from the inflow port 211 to a space between a pair of electric motors 43 inside the lower cross member 201, and is subsequently branched toward the electric motors 43. The branched cooling air passes between the projections 210 to enter a space between the electric motors 43 and the lower cross member 201, flows to the ends while cooling the electric motors 43 from an outer circumference thereof, and flows to the outside from the gaps on both the sides of the lower cross member 201.

In the exemplary embodiment, the hollow portion of the lower cross member 201 defines a duct 72 configured to circulate the cooling air.

The arrangement for flowing the cooling air to the outside is not limited to the arrangement for flowing the cooling air to the outside from the gaps on the fastening units between the lower cross member 201 and the electric motors 43. A plurality of outflow openings, through which the cooling air is discharged, may be provided on both the sides of the lower cross member 201.

Explanation of Layout of Devices

FIG. 9 is a plan view showing a layout of the devices 41 to 49.

As shown in FIG. 9, the devices 41 to 49 are disposed on the vehicle body frame 20 as follows in consideration of a weight balance and maintenance capability of the vehicle body 10. Specifically, in the order from the first travel direction of the vehicle body frame 20 (in the order from the left to the right in FIG. 9), the controller 49, a pair of electric motors 43, 43 configured to drive the tires 11, the engine 41, the generator motor 42, a pair of electric motors 43, 43 configured to drive the tires 12, and a second controller 49 are disposed substantially in alignment. The engine 41 is the heaviest device among the above devices and is disposed closer to the middle of the vehicle body frame 20 than the first vertical frame 21.

In the middle of the vehicle body frame 20 in the travel direction, at a position outwardly away from the vehicle body frame 20 in the first vehicle width direction, the first radiator 44 for the engine 41 is disposed and the first cooling fan 45 is disposed to an inner side of the first radiator 44. At a position outwardly away from the vehicle body frame 20 in the second vehicle width direction, the second radiator 46 for the water-cooling type aftercooler 41A is disposed and the second cooling fan 47 is disposed to an inner side of the second radiator 46.

The first and second radiators 44 and 46 are substantially the same in size and the first and second cooling fans 45 and 47 are substantially the same in size. The first and second radiators 44 and 46 are disposed symmetrically with respect to the above-described second center line 10B and the first and second cooling fans 45 and 47 are disposed symmetrically with respect to the above-described second center line 10B (see FIG. 4). The first and second cooling fans 45 and 47 are suction fans. A cooling air sucked from the outside and having been subjected to heat exchange with the cooling water of the engine 41 at the first and second radiators 44 and 46 and a cooling air having been subjected to heat exchange with the cooling water of the aftercooler 41A are delivered toward the engine 41 and the generator motor 42 provided in the middle of the vehicle body frame 20 to cool the engine 41 and the generator motor 42 from outer sides thereof.

A pair of brake resistors 48, 48 covered with respective exterior covers are disposed on the second radiator 46 and the second cooling fan 47 (see FIG. 1). Cooling fans (not shown) configured to respectively cool the brake resistors 48 are housed inside the respective exterior covers. Such cooling fans are discharge fans. The brake resistors 48 are collectively disposed on one side of the vehicle body frame 20 in order to put priority on maintenance capability. Since the brake resistors 48 have a light weight compared with those of the other devices, a weight balance of the vehicle body 10 is less affected even by the disposition of the brake resistors 48 only on the one side of the vehicle body frame 20.

The first and second radiators 44 and 46, the first and second cooling fans 45 and 47, and the brake resistor 48 are mounted on the support frame 81. The support frame 81 is fixed to the lower side member 23 and the upper side member 24 of the vehicle body frame 20 by a fastening unit (e.g., a bolt).

At the outside of the vehicle body frame 20 in the first vehicle width direction, the first radiator 44 and the first cooling fan 45 bridge over a pair of L-shaped frames 85 juxtaposed in the travel direction to be supported by the frames 85 and are disposed in an area between the tires 11 and 12. The first radiator 44 and the first cooling fan 45 are mounted in the middle of the vehicle body frame 20 in the travel direction via the support frame 81 (see the first center line 10A in FIG. 1).

Similarly, at the outside of the vehicle body frame 20 in the second vehicle width direction, the second radiator 46 and the second cooling fan 47 bridge over the pair of L-shaped frames 85 juxtaposed in the travel direction to be supported by the frames 85. The second radiator 46 and the second cooling fan 47 are disposed in an area between the tires 11 and 12. The second radiator 46 and the second cooling fan 47 are mounted in the middle of the vehicle body frame 20 in the travel direction via the support frame 81 (see the first center line 10A in FIG. 1).

Attachment Position of Hoist Cylinder and Relationship Between Hoist Cylinder and Engine FIG. 11 is an illustration of an attachment position of the hoist cylinder 35 in the travel direction, which is viewed in a direction indicated by an arrow XI-XI in FIG. 4. FIG. 12 is a side view showing the attachment position of the hoist cylinder 35. However, the steering mechanism is not shown in FIG. 11.

As shown in FIGS. 11 and 12, upper ends of the pair of hoist cylinders 35 are rotatably attached to the attachment portions 36 provided in the middle of the lower surface of the body 30. At the second side of the vehicle body frame 20 in the travel direction, a pair of hoist supports 212 are juxtaposed in the vehicle width direction on the lower cross member 201 on which the second vertical frame 22 stands. The lower ends of the pair of hoist cylinders 35 are rotatably supported by the respective hoist supports 212 to be supported near the set positions of the tires 12 in the travel direction. The hoist cylinders 35 set at such positions are supported with a large distance from the engine 41 and the generator motor 42 connected to the engine 41 near the hoist cylinders 35.

The hoist supports 212 are respectively provided at the positions where the electric motors 43 are housed in the lower cross member 201, in other words, at the positions reinforced by the electric motors 43 in the lower cross member 201. Moreover, the lower cross member 201 is a member on which the second vertical frame 22 provided with the body support 206 stands. Accordingly, the portion to receive the carrying load of the standing body 30 is focused on the second vertical frame 22 and the lower cross member 201 positioned between the right and left tires 12. The carrying load is transmitted from the body supports 206 and the hoist supports 212 of the hoist cylinders 35 to the road surface immediately under the tires 12 through the suspension 50 and the tires 12. The carrying load does not act on the lower side member 23 and the upper side member 24 (see FIG. 12).

As shown by solid lines in FIG. 12, the body 30 is raised in the second travel direction by extending the hoist cylinder 35, thereby performing an unloading operation. When the body 30 is sufficiently raised at or exceeding a predetermined angle, the hoist cylinders 35 substantially vertically stand. In such a condition, a large open-top space is defined from the first vertical frame 21 to the middle of the vehicle body frame 20, in other words, above the portion where the engine 41 is mounted. Since the body 30 and the hoist cylinders 35 are not present in this space, the engine 41 disposed near the middle of the vehicle body frame 20 can be suspended with a wire or the like with use of this space and is configured to be moved up and down while being suspended when the engine 41 is detached and attached for maintenance.

In addition, the engine 41 is disposed in a region defined by the first vertical frame 21, the second vertical frame 22, a pair of right and left lower side members 23, and a pair of right and left upper side members 24. As shown in FIG. 12, there is an open space between the lower side members 23 and the upper side members 24 so that the engine 41 is accessible from the outside of the vehicle body frame 20. With this arrangement, even while the engine 41 is mounted on the vehicle body frame 20, maintenance of the engine 41 can be easily conducted from the right and left sides of the vehicle body frame 20.

Travelling of Driverless Dump Truck

The above-described dump truck 1 travels between a loading site where dug minerals are taken in the dump truck 1 as a load and an unloading site where the load is unloaded. At this time, when the dump truck 1 travels on an outward road toward the unloading site, the side of the dump truck 1 supporting the body 30, in other words, near the second vertical frame 22 is defined as the back (rear) of the dump truck 1 and the side thereof near the first vertical frame 21 is defined as the front of the dump truck 1. When the dump truck 1 travels on a return road after the unloading, since the dump truck 1 is not turned around, the side of the dump truck 1 near the second vertical frame 22 is defined as the front of the dump truck 1 and the side thereof near the first vertical frame 21 is defined as the back (rear) of the dump truck 1 (shuttle travelling).

However, the dump truck 1 may be turned around as needed and travel with either the first vertical frame 21 or the second vertical frame 22 constantly defined as the front of the dump truck 1.

It should be understood that the scope of the invention is not limited to the above-described exemplary embodiment(s) but includes modifications and improvements as long as the modifications and improvements are compatible with the invention.

In the above exemplary embodiment, the driving unit is described in a form of the electric motor 43. However, the driving unit is not limited thereto but a hydraulic motor may be used.

Moreover, when it is not necessary to cool the driving unit (a hydraulic motor and/or electric motor) using the cooling air, the projection 210 provided in the lower cross member 201 may be shaped in a ring continuously formed in a circumferential direction.

Further, the projection 210 may be provided to the driving unit instead of providing to the inner surface of the hollow part. Alternatively, such a projection may be omitted depending on an outer diameter of the driving unit and an inner diameter of the hollow part and the driving unit may be directly supported by the inner surface of the hollow part.

In the above exemplary embodiment, the pair of vertical members 202 and the upper cross member 203 define each of the first vertical frame 21 and the second vertical frame 22 in a portal shape. However, a single vertical member may be provided to define a T-shaped vertical frame.

However, in this arrangement, the single vertical member stands in the middle of the lower cross member 201 in the vehicle width direction and the support 207 for the upper arm 51 cannot be formed to the vertical member, which necessitates forming the supports 207 on both sides of the lower cross member 201 to possibly complicate the structure. Accordingly, in order to simplify the structure, it is preferable to form the first vertical frame 21 and the second vertical frame 22 in a portal shape with a pair of vertical members 202 and provide the support 207 to each of the vertical members 202 as in the above exemplary embodiments.

The invention is also applicable to a manned off-road dump truck including a cab.

The invention claimed is:
1. A dump truck comprising:
a vehicle body frame;
a body supported by the vehicle body frame and configured to be raised and lowered;
a plurality of tires provided to the vehicle body frame via a suspension; and
a driving unit configured to drive the tires,
wherein the vehicle body frame comprises:
    a support that provides support to a suspension arm of the suspension, a frame space being defined inside the vehicle body frame at a portion at which the support is provided, and
    a hollow part in the vicinity of the support and in fluid communication with the frame space, and
wherein the driving unit is fixed to the vehicle body frame while being housed in the hollow part of the vehicle body frame and supported by an inner surface of the hollow part.

2. The dump truck according to claim 1, wherein
the vehicle body frame comprises a vertical member extending vertically upward, a lower end of which is connected to the vehicle body frame in the vicinity of the hollow part, and
the body is mounted on a mount portion that is provided on an upper portion of the vertical member.

3. The dump truck according to claim 1, wherein
the driving unit is supported by a projection that projects from the inner surface of the hollow part toward the driving unit.

4. The dump truck according to claim 3, wherein
the driving unit is an electric motor,
the projection is provided by a plurality of projections spaced from each other in a circumferential direction of the inner surface, and
the plurality of projections are configured to allow a passage of a cooling air for cooling the electric motor between the projections.

5. A dump truck comprising:
a vehicle body frame;
a body supported by the vehicle body frame and configured to be raised and lowered;
tires provided to a first side and a second side of the vehicle body frame in a travel direction via a suspension; and
an electric motor configured to drive the tires,
the vehicle body frame comprising:
  a pair of front and back lower cross members extending in a vehicle width direction and provided at positions of the tires provided to the first side and the second side of the vehicle body frame in the travel direction in a side view;
  vertical members extending vertically upward from both sides of each of the pair of front and back cross members in the vehicle width direction; and
  an upper cross member extending in the vehicle width direction in a manner to connect upper ends of the respective vertical members, wherein:
a support that provides support to a suspension arm of the suspension is provided on each end of each of the lower cross members and on a lower portion of each of the vertical members connected to each of the lower cross members,
a frame space is defined inside the vehicle body frame at a portion at which the support is provided,
each of the lower cross members defines a hollow part that is in fluid communication with the frame space,
the electric motor is fixed to the vehicle body frame while being housed in the hollow part of each of the lower cross members and supported by an inner surface of the hollow part, and
the body is mounted on a mount portion that is provided on the upper cross member.

6. The dump truck according to claim 1, wherein the hollow part is positioned vertically below the support.

* * * * *